US012638665B2

(12) United States Patent
Deeg

(10) Patent No.: US 12,638,665 B2
(45) Date of Patent: May 26, 2026

(54) APPARATUS AND METHOD FOR CONFOCAL OBSERVATION OF A SAMPLE

(71) Applicant: TILL I.D. GmbH, Planegg (DE)

(72) Inventor: Andreas Deeg, Weyarn (DE)

(73) Assignee: TILL I.D. GMBH, Planegg (DE)

( * ) Notice: Subject to any disclaimer, the term of this patent is extended or adjusted under 35 U.S.C. 154(b) by 0 days.

(21) Appl. No.: 19/087,200

(22) Filed: Mar. 21, 2025

(65) Prior Publication Data

US 2025/0298231 A1     Sep. 25, 2025

(30) Foreign Application Priority Data

Mar. 22, 2024    (DE) ...................... 10 2024 108 329.8

(51) Int. Cl.
*G02B 21/00*        (2006.01)
*G01N 21/64*        (2006.01)
*G02B 21/06*        (2006.01)
*G02B 21/36*        (2006.01)

(52) U.S. Cl.
CPC ......... *G02B 21/06* (2013.01); *G01N 21/6458* (2013.01); *G02B 21/0076* (2013.01); *G02B 21/361* (2013.01)

(58) Field of Classification Search
CPC .. G02B 21/06; G02B 21/0076; G02B 21/361; G01N 21/6458
See application file for complete search history.

(56) References Cited

U.S. PATENT DOCUMENTS 5,633,751 A * 5/1997 Tanaami .............. G02B 3/0056
                                                      359/368
11,543,640 B2   1/2023 Chen et al.

FOREIGN PATENT DOCUMENTS

| DE | 102007009551 B3 | 8/2008 |
| DE | 102015112960 B3 | 10/2016 |
| DE | 102022108448 B3 | 5/2023 |
| EP | 0539691 A2 | 5/1993 |
| JP | 4012709 B2 * | 11/2007 |

(Continued)

OTHER PUBLICATIONS

German Decision to Grant Application No. 10-2024-108-329.8 dated Mar. 12, 2024.

(Continued)

*Primary Examiner* — Mustak Choudhury
(74) *Attorney, Agent, or Firm* — Harness, Dickey & Pierce, P.L.C.

(57)          ABSTRACT

A device for confocal observation of a sample comprises at least one disk-like body, wherein the at least one disk-like body comprises on a first side a plurality of micro-optical elements and on a second side a correspondingly arranged pinhole pattern formed by a plurality of pinholes, wherein the plurality of micro-optical elements arranged on the first side comprise a convex, dichroically coated front surface, wherein for excitation of the sample the disk is illuminated on its side facing the tube lens with collimated light which is reflected back to the tube lens by the plurality of curved, dichroically coated surfaces on the disk in such a way that a corresponding excitation spot pattern is created therefrom in the object plane of the microscope, which excitation spot pattern, after having passed the tube lens and the plurality of curved, dichroically coated surfaces, can be spatially filtered and detected.

14 Claims, 8 Drawing Sheets

(56)        References Cited

FOREIGN PATENT DOCUMENTS

JP          2021140030  A  *  9/2021
JP             7415674  B2     1/2024

OTHER PUBLICATIONS

German Exam Report Application No. 10-2024-108-329.8 dated
Sep. 19, 2024.

* cited by examiner

Fig. 6

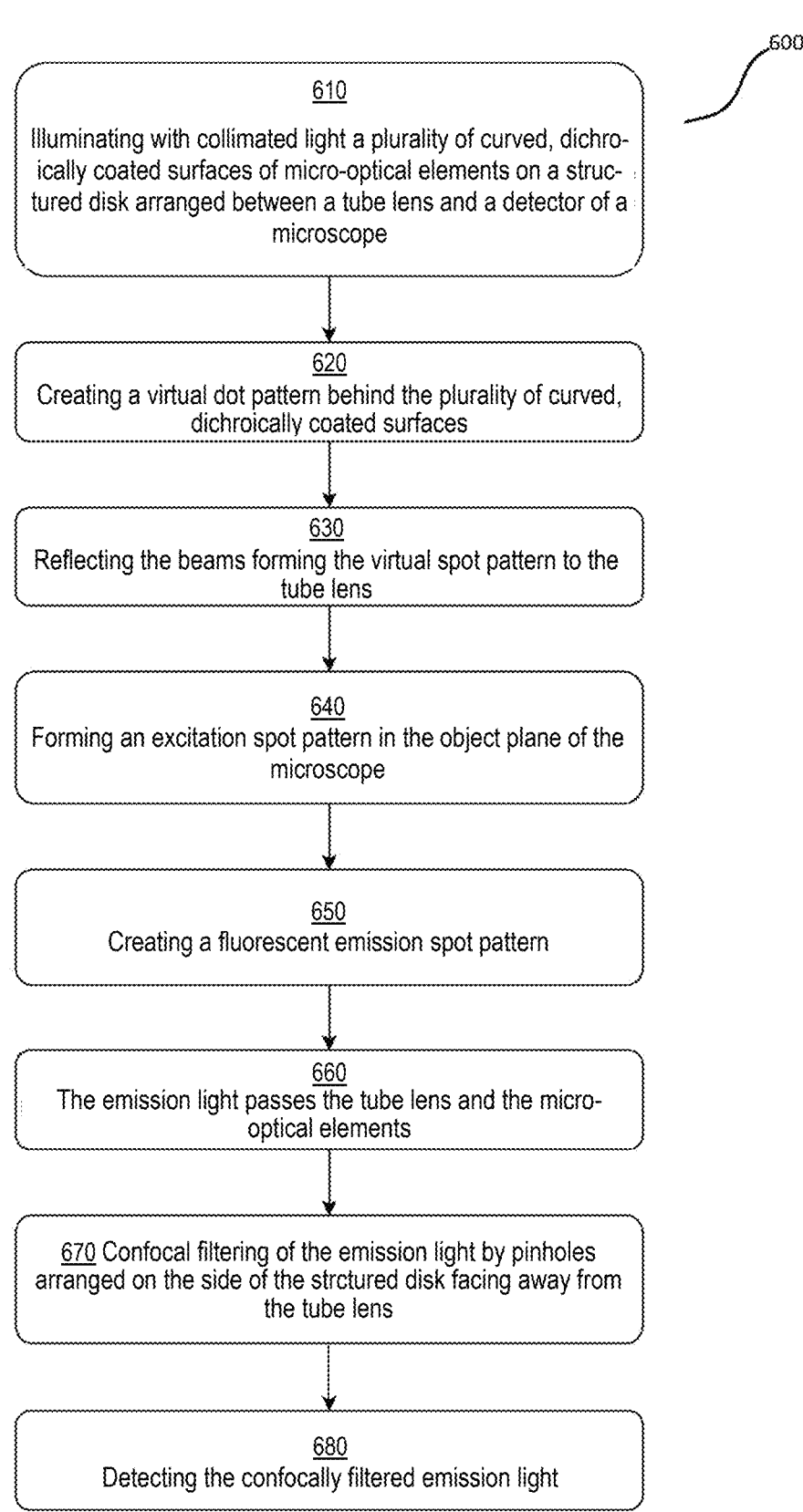

600

610
Illuminating with collimated light a plurality of curved, dichroically coated surfaces of micro-optical elements on a structured disk arranged between a tube lens and a detector of a microscope

620
Creating a virtual dot pattern behind the plurality of curved, dichroically coated surfaces

630
Reflecting the beams forming the virtual spot pattern to the tube lens

640
Forming an excitation spot pattern in the object plane of the microscope

650
Creating a fluorescent emission spot pattern

660
The emission light passes the tube lens and the micro-optical elements

670 Confocal filtering of the emission light by pinholes arranged on the side of the strctured disk facing away from the tube lens

680
Detecting the confocally filtered emission light

APPARATUS AND METHOD FOR CONFOCAL OBSERVATION OF A SAMPLE

CROSS-REFERENCE TO RELATED APPLICATION(S)

The present application claims priority under 35 U.S.C. § 119 to German Patent Application No. 10 2024 108 329.8, filed Mar. 22, 2024, the entire contents of which is incorporated herein by reference.

TECHNICAL FIELD

The present disclosure relates to the field of microscopy. In particular, the present invention relates to devices and methods for spatially (confocally) filtered imaging of fluorescent specimens.

BACKGROUND

In all areas of microscopy, efforts are being made to increase the optical resolution and contrast of images. One approach, which is used particularly in fluorescence microscopy, involves the use of a spatially filtering pinhole to block out-of-focus light during image generation. Here, the light reflected or emitted by the sample is filtered through a so-called pinhole aperture, which is located exactly in the image plane of the microscope system. As a result, mainly light from a specific focal plane is transmitted, while light from outside this focal plane is blocked. This filtering reduces interfering background signals and improves the contrast ratio and image quality. The result is known as confocal imaging.

A variant of this confocal imaging by spatial filtering of excitation and emission light is based on the arrangement of movable pinholes on a rotating disk. Here, a pinhole mask is rotated around a central axis of rotation and all points of the object to be observed are illuminated through the pinholes for as long as possible. Such a rotating disk is generally referred to as a Nipkow disk. Nipkow microscope systems are fast and gentle on the specimen, but suffer from poor light yield if only the light that passes through the pinholes is used in the excitation beam path without having been focused through them beforehand. This problem can be countered by focusing the excitation light onto the pinholes. A second rotating disk with a corresponding arrangement of micro lenses is usually used for this purpose. This disk is located in the illumination beam path in front of the pinhole disk in such a way that the pinhole plane coincides with the focal plane of the microlenses and the focal points generated by the microlenses fall exactly into the pinhole openings. If both disks now rotate around a common axis, many (usually >1,000) simultaneously illuminated spots are obtained on the sample, which expose the entire surface of the sample as seen by the detector due to the rotation and capture the emission light generated there with confocal filtering through the pinholes.

Such spinning disk systems, i.e., confocal microscope systems based on the Nipkow principle, are becoming increasingly popular in live cell microscopy.

Some significant disadvantages of such methods, in which the excitation and emission beams must pass through the same pinholes, result from the combination or separation of the excitation and emission beams, which must take place in the finite optical space between the microlens and pinhole disks. In addition, the two disks must be precisely aligned with each other.

DE 10 2015 112 960 B3 describes a device for confocal observation of a sample with a rotating disk and a plurality of pinholes for confocal filtering of the emitted light, in which—unlike in the previous prior art (EP0539691A2, DE102007009551B3)—collimated excitation light does not—as seen from the microscope—come from behind the disk, where it is formed into illumination spots by micro-optical elements and passes the pinholes in the direction of the microscope, but from the front. According to DE 10 2015 112 960 B3, the rotating disk is illuminated with collimated light from the microscope direction, reflected at the disk and formed into excitation spots that produce the desired excitation pattern in the sample, which rotates with the disk. Beam shaping and reflection occur on two different surfaces, (i) a micro-optically curved (thus refracting) first surface, which allows the collimated light to converge, and (ii) a flat mirrored surface, which reflects the converging light beams back. After passing the curved surface (i) for the second time, the beams converge in front of the disk to form excitation spots, which the microscope images into the sample. To ensure that the resulting emission image does not also come to rest in front of the disk, where there is no possibility of confocal filtering, DE 10 2015 112 960 B3 places the pinholes for confocal filtering as openings in the plane reflecting surface (ii) on the disk and separates or combines the excitation and emission beams from and with each other using two plane dichroic mirrors in such a way that the former is reunited with the emission beam after passing through a path length shift arrangement in such a way that the image of the emitted spots falls exactly into the conjugated pinholes. In DE 10 2015 112 960 B3, separation and merging for path length equalization are performed with the aid of two planar dichroically reflective surfaces. However, this has the disadvantage that the required separation and subsequent unification of the excitation and emission beams is associated with the highly critical adjustment of two reflection angles and that the length of the detour must also be adjusted very precisely.

SUMMARY OF THE INVENTION

The object of the present invention is to overcome, at least in part, the disadvantages known in the prior art. The above object is achieved by a structured disk according to claim 1, a device according to claim 6, and a method according to claim 10. Preferred embodiments are the subject of the respective subclaims.

In one aspect, the present invention is directed to a structured disk for confocal observation of a sample, in particular a fluorescent sample with an imaging optical system. According to the invention, the structured disk comprises at least one disk-like body preferably formed of glass, the at least one disk-like body having on a first side a plurality of micro-optical elements and on a second side a correspondingly arranged pinhole pattern formed by a plurality of pinholes, the plurality of micro-optical elements arranged on the first side having a convex, dichroically coated front surface. According to the invention, the disk-like body can be formed from any material known to the skilled person which has the corresponding optical properties or can be provided with them. Similarly, mixtures and combinations of different materials can also be used. According to the invention, the dichroic coating is determined as a function of the respective use and is to be selected such that the excitation light to be used is reflected, but the resulting emission light is transmitted. Accordingly, in preferred embodiments, the coating can be a long-pass coating in which excitation light is reflected and emission light is transmitted. Alternatively, the coating may be a multiband coating in which several wavelength ranges are reflected and/or absorbed. Preferably, the micro-optical elements and the pinholes are correlated in pairs, i.e. arranged around their respective central axis.

In one embodiment of the present invention, the distance between the first and second sides of the disk may be selected such that light which is inverse to divergent light resulting from reflection of collimated light at the convex micro-optical elements of the first side is focused into the respective pinholes after transmission through the dichroic coating.

In one embodiment of the structured disk according to the present invention, the convexly curved, dichroically coated surfaces may be molded in a medium, the medium preferably having the same refractive index as the plurality of micro-optical elements. In this case, the convexly curved, dichroically coated surfaces can be molded in such a way that an uncurved surface arranged parallel to the disk-shaped body is formed, whereby the plane of the virtual illumination spots coincides with the plane of the pinhole mask.

In another embodiment of the structured disk according to the present invention, the plurality of convexly curved dichroically coated surfaces on the first side may be opposed by a second arrangement of convexly curved surfaces on the opposite side.

In another embodiment of the structured disk according to the present invention, the disk may comprise a first disk-shaped body and a second disk-shaped body, wherein the plurality of micro-optical elements on the first disk-shaped body and the plurality of pinholes on a second disk-shaped body are arranged in correlation with each other.

In another embodiment of the structured disk according to the present invention, the disk may comprise a second disk-shaped body on which a plurality of conjugate diverging lenses are arranged, each diverging lens being arranged correspondingly with a micro-optical element and a pinhole about respective central axes.

In another aspect, the present invention is directed to a device for confocal observation of a fluorescent sample with a microscope, the device comprising at least one structured disk as described above, which is rotatable about a central axis. The structured disk is arranged between a tube lens and a detector of the microscope such that the plurality of micro-optical elements face the tube lens. To excite the sample, the side of the disk facing the tube lens is illuminated with collimated light, which, due to the large number of curved, dichroically coated surfaces on the disk, creates a virtual spot pattern behind these surfaces and the rays are reflected back to the tube lens in such a way that, in interaction with the objective of the microscope, a corresponding excitation spot pattern is created in the microscope's object plane. The excitation spot pattern creates a fluorescent spot pattern in the sample which, after passing backwards through the objective and tube lens, hits the multitude of curved, dichroically coated surfaces where the excitation light was reflected, but is now transmitted due to the dichroically property of the reflecting surfaces, and, because the transmitted beams combine to form focal points in front of the plane of the virtual excitation spot pattern due to the refractive power of the curved surfaces, they are spatially (confocally) filtered in this plane by a correspondingly arranged pinhole pattern. According to the invention, this pinhole plane can be imaged onto a detector, in particular a camera, using an optical system. A detector in the sense of the present invention is any means for detecting the emission light, and can accordingly be a camera, a light-sensitive chip or even the human eye.

In one embodiment of the device according to the present invention, the device may further comprise a coupling mirror arranged centrally in the focal plane of the tube lens. Here, the coupling mirror can preferably be aligned in the image beam path such that light focused onto the mirror by a focusing element, after passing the tube lens, strikes the disk and plurality of micro-optical elements perpendicularly as collimated excitation light and is reflected back to the tube lens from there. In a preferred embodiment, the coupling mirror may be arranged on a glass element that transmits both excitation light and emission light, and can be arranged with this glass element at least partially in the beam path.

In another embodiment, a large mirror can also be used, preferably at an angle of 45° to the lens axis with a small coupling hole on the beam axis in the lens pupil or in its vicinity. This mirror can be used to deflect the emission and excitation light (by 90°). In this embodiment, the excitation light can be coupled in by focusing through the coupling hole of the mirror, creating the required collimated light field on the disk.

In another embodiment of the device according to the present invention, the focal plane of the tube lens may coincide with the rear focal plane of the objective lens.

In another embodiment of the device according to the present invention, the structured disk, which is rotatable about a central axis, may be replaced by a planar dichroic mirror, the planar dichroic mirror being tilted by an angle (Θ), whereby the reflected excitation light in the focal plane of the tube lens, which preferably coincides with the focal plane of the objective, is deflected past the coupling mirror or the coupling hole and formed by the objective into an oblique wide-field illumination of the sample.

In another aspect, the present invention is directed to a method for confocal observation of a scattering and preferably fluorescent sample with a microscope. The method comprises the steps of illuminating the sample and detecting confocally filtered emission or scattered light. Illuminating the sample comprises illuminating with collimated light a plurality of curved, dichroically coated surfaces on a structured disk arranged between a tube lens and a detector of a microscope, in particular a structured disk as described above. According to the invention, the structured disk is arranged between the tube lens and the detector of a microscope in such a way that the plurality of curved, dichroically coated surfaces face the tube lens. By illuminating the plurality of curved, dichroically coated surfaces with collimated light, a virtual spot pattern is generated behind these surfaces and the rays are reflected back to the tube lens in such a way that a corresponding excitation spot pattern is created in the object plane of the microscope. The resulting excitation spot pattern, in turn, creates a fluorescent spot pattern in the sample which, after passing backwards through the tube lens, hits the plurality of curved, dichroically mirrored surfaces where the excitation light was reflected, but is now transmitted due to the dichroically property of the reflecting surfaces, and, because the transmitted beams combine to form focal points in front of the plane of the virtual excitation spot pattern due to the refractive power of the curved surfaces, they are spatially (confocally) filtered in this plane by a correspondingly arranged pinhole pattern.

BRIEF DESCRIPTION OF THE FIGURES

The accompanying figures illustrate exemplary embodiments and applications of the present invention.

FIG. 6 shows a flow chart of the method according to the invention.

DETAILED DESCRIPTION

The present invention will now be described in more detail with reference to the accompanying drawings. However, the invention may be embodied in many different forms and should not be construed to be limited to the embodiments illustrated herein. It should be noted that the figures illustrate general features of the devices and methods utilized in the respective embodiments. However, these figures may not represent the exact structure or feature of a given embodiment. In addition, identical reference signs in the figures denote corresponding parts across the different views or embodiments.

Figure 1A:
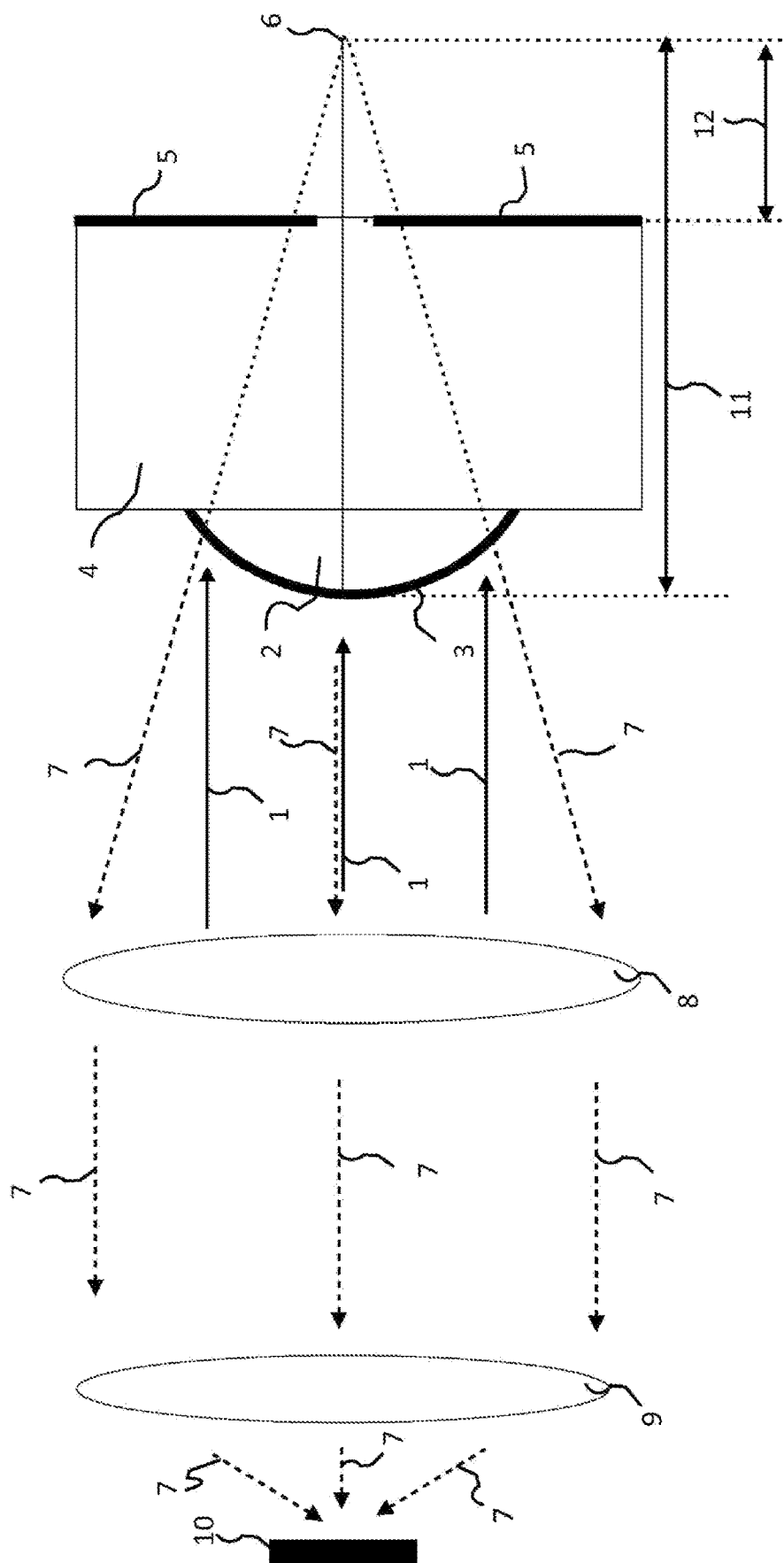
FIGS. 1a and 1b show a device according to the invention.
Figure 1B:
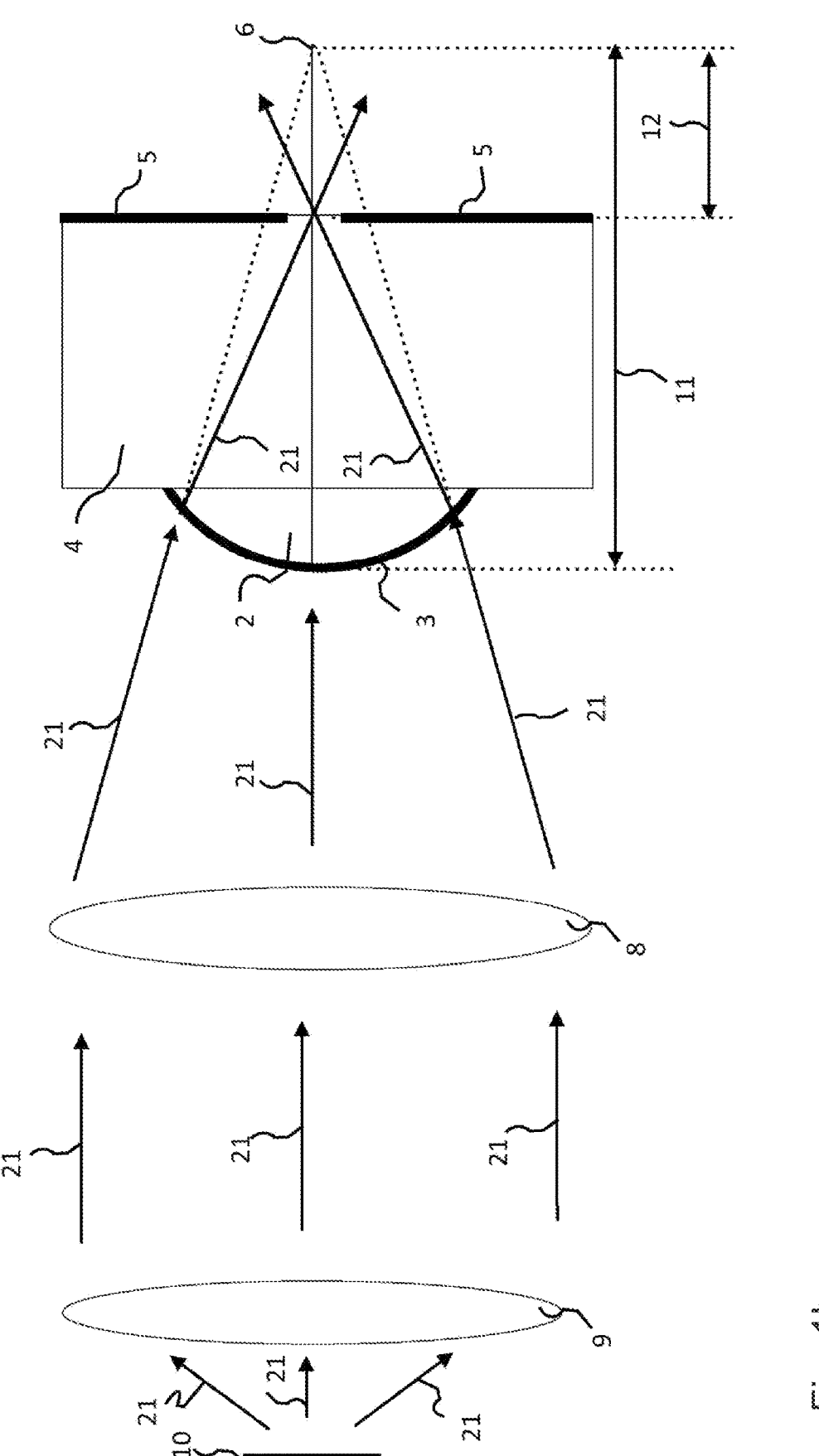

The present invention, as shown in FIGS. 1a and 1b, avoids the disadvantage of DE 10 2015 112 960 B by involving a virtual path length 11, which reduces the required path length compensation until it disappears completely and avoids the need to separate and recombine the excitation and emission beams, because a single, curved dichroic surface 3 is sufficient for this purpose. Its focal point 6 is of a virtual nature and is not—as seen from the microscope—in front of but behind the convex reflective surfaces 3. The optical system thus becomes self-aligning, the critical angular adjustment of the two dichroics is eliminated and the virtual (negative) focal length 11 during focus generation compensates for the required path length difference 12, in the case shown largely. The remainder can be precisely adjusted by the thickness of the glass substrate 4, i.e. by the distance between the microlens surface 3, which is refractive for the emission light, and the pinhole mask 5 applied to the back of the glass substrate 2.

FIG. 1a shows the microscope set-up according to the invention, omitting the part that generates the collimated excitation light 1, which preferably strikes the disk perpendicularly, between the tube lens 8 and the disk 4. After reflection at the dichroically coated surface 3 of the micro-optical elements of the structured disk, which are designed here as microlenses 2, they become the rays of the excitation spot pattern 7, which appear to come from the virtual focus 6 of the convexly curved virtual surface 3 of the microlens 2. Due to the coating, the convex curved surfaces 3 are convex mirrors for the excitation light. They are imaged through the tube lens 8 to infinity and from the objective 9 into the sample 10, where fluorescence excitation occurs. The resulting emission light 21 (FIG. 1b) passes via the objective 9 and the tube lens 8 back to the dichroically mirrored lens surface 3, which is transparent to the emission light and has refracting properties as lens 2. This means that the real focal points are located with a path length difference 12 in front of the virtual focal plane 6 of the dichroic mirror 3, in the pinhole plane 5. The refractive power of the microlens 2 increases the numerical aperture (NA) of the spots in the pinhole plane 5 by the factor of the path lengths 11/(11-12), and the focal points are compressed accordingly, which leads to a certain increase in resolution. If this is not desired, the refractive power of the microlens 2 can be made to disappear by embedding the curved surface 3 in a medium that has the same refractive index as the microlens 2. This reduces the property to a micro-optical element with a curved, dichroically mirrored surface.

Figure 2B:
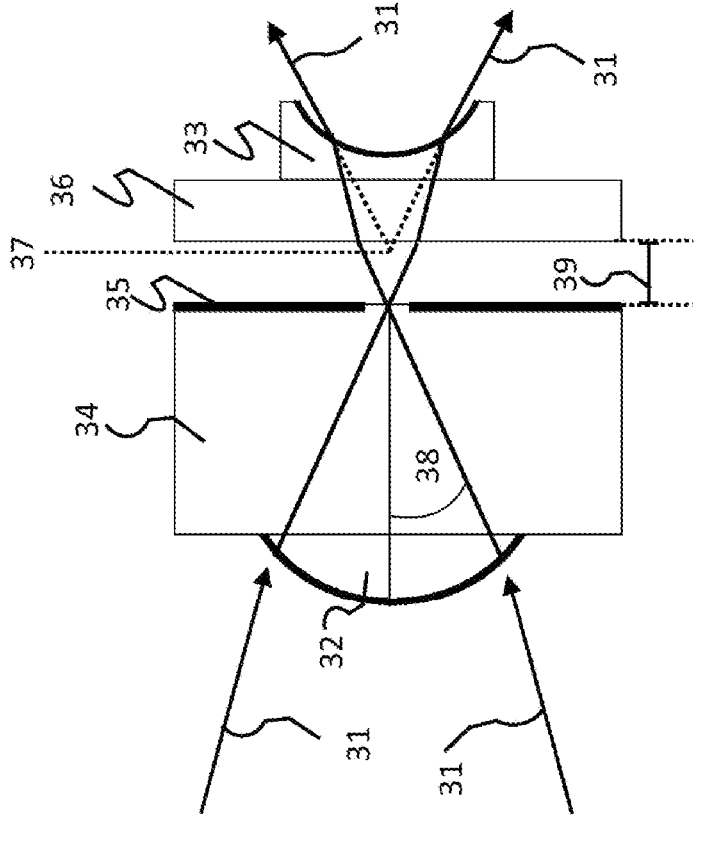
FIGS. 2a and 2b show embodiments according to the invention for increasing the resolution.
Figure 2A:
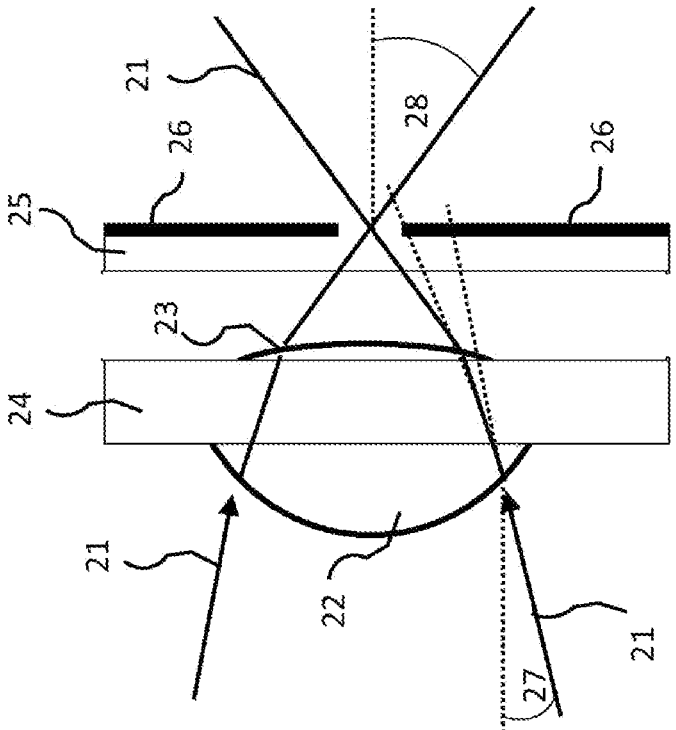

According to the invention, one way of utilizing the aforementioned increase in resolution to the maximum, i.e. up to a doubling of the original emission spot NA (NA 28=2×NA 27), is to increase the refractive power of the microlenses, as shown in FIG. 2a. The pinholes 26 are then moved to a second disk 25 and precisely aligned with the microlenses 22 and 23 of the first disk 24. Confocal filtering then takes place at the already compressed spots.

Alternatively, as shown in FIG. 2b, the NA 38 of the emission light cone 31 is subsequently virtually enlarged after passing the pinholes 35 on the rear side of the disk 34 and the virtual spot size in the plane 37 is reduced accordingly. For this purpose, a second disk 36 is paired behind the first disk 34 with a pattern of diverging lenses 33 conjugated to the pinholes 35 of the first disk 34. The two disks 34 and 36 can be separated by an air gap 39, but this can also be reduced to zero by cementing both disks 34 and 36 together.

In order to couple the collimated excitation light 41 into the microscope in such a way that it homogeneously illuminates the desired image field 42 on the disk 44 rotating around the axis 43, an intermediate image field 45 conjugate to the image field on the disk 42 is required whose emission NA is so low that the excitation light 41 generated from it with the aid of the tube lens 47 and the focusing element 48 has the desired collimation when it hits the disk 44. An intermediate image field 45 with the dimensions of 14×14 mm should emit light with an NA<0.001, provided that the focal lengths of the two tube lenses 47 and 48 are the same.

Figure 3A:
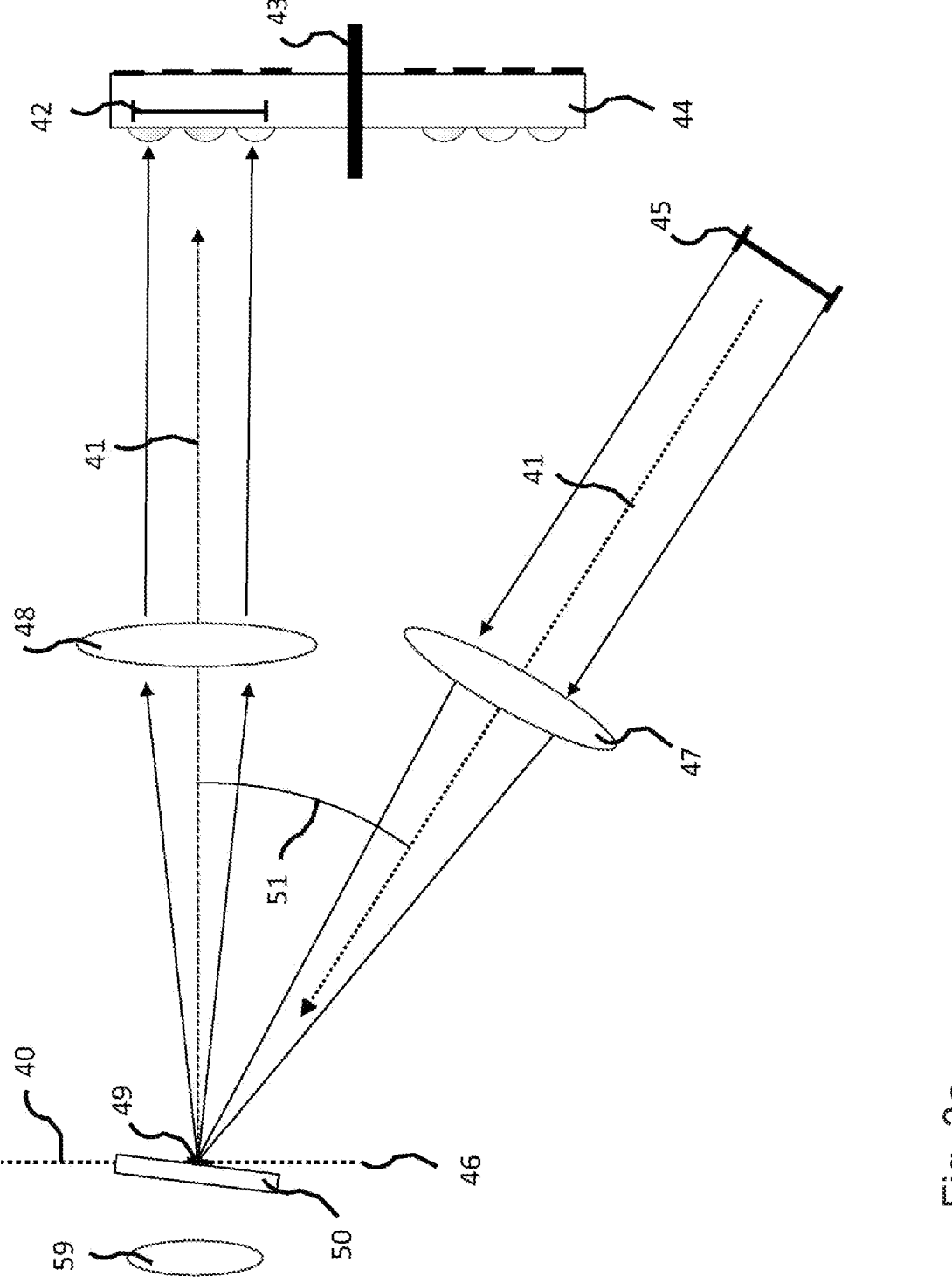
FIGS. 3a and 3b show the coupling of collimated excitation light into the device according to the invention.
Figure 3B:
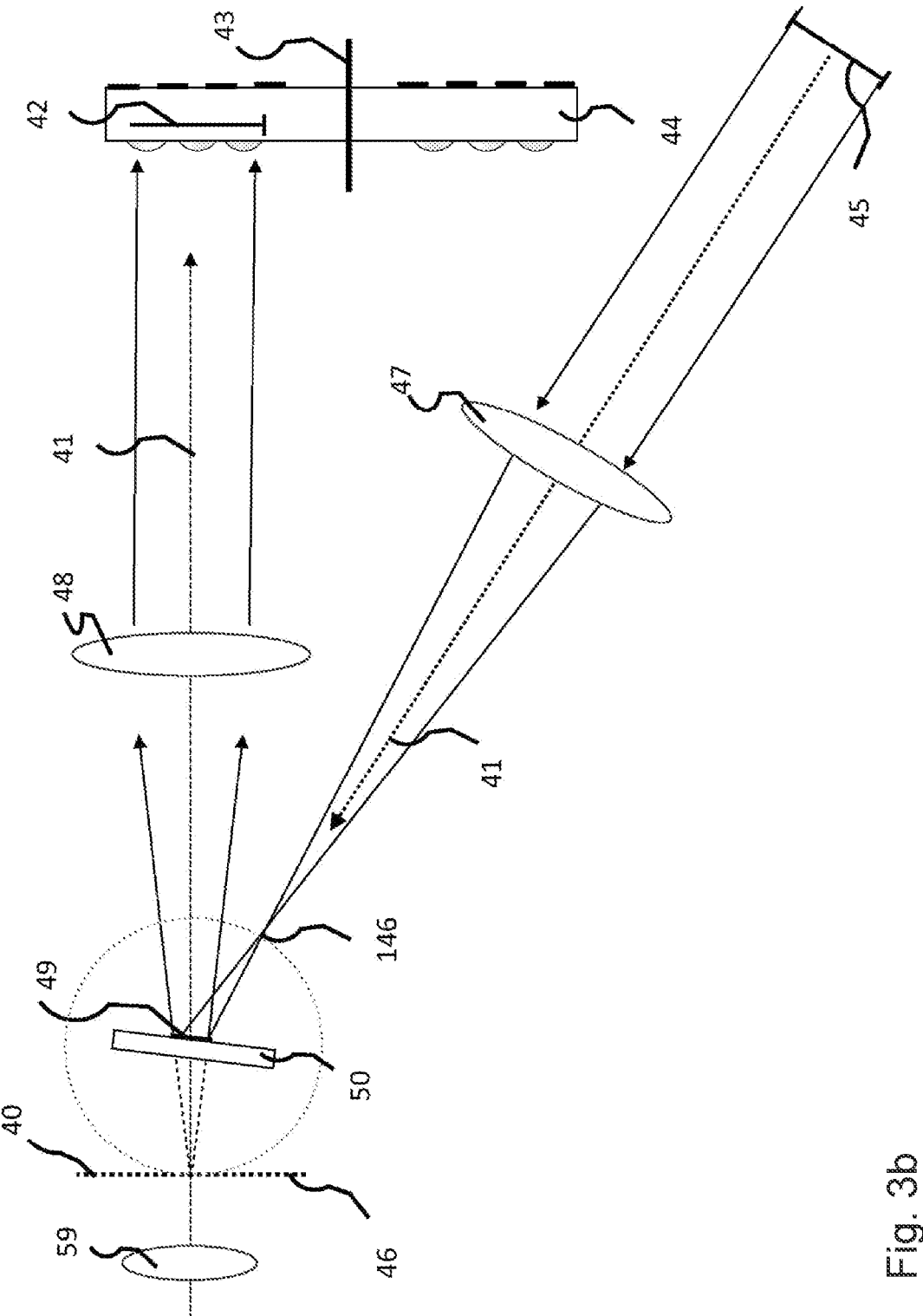
Figure 4:
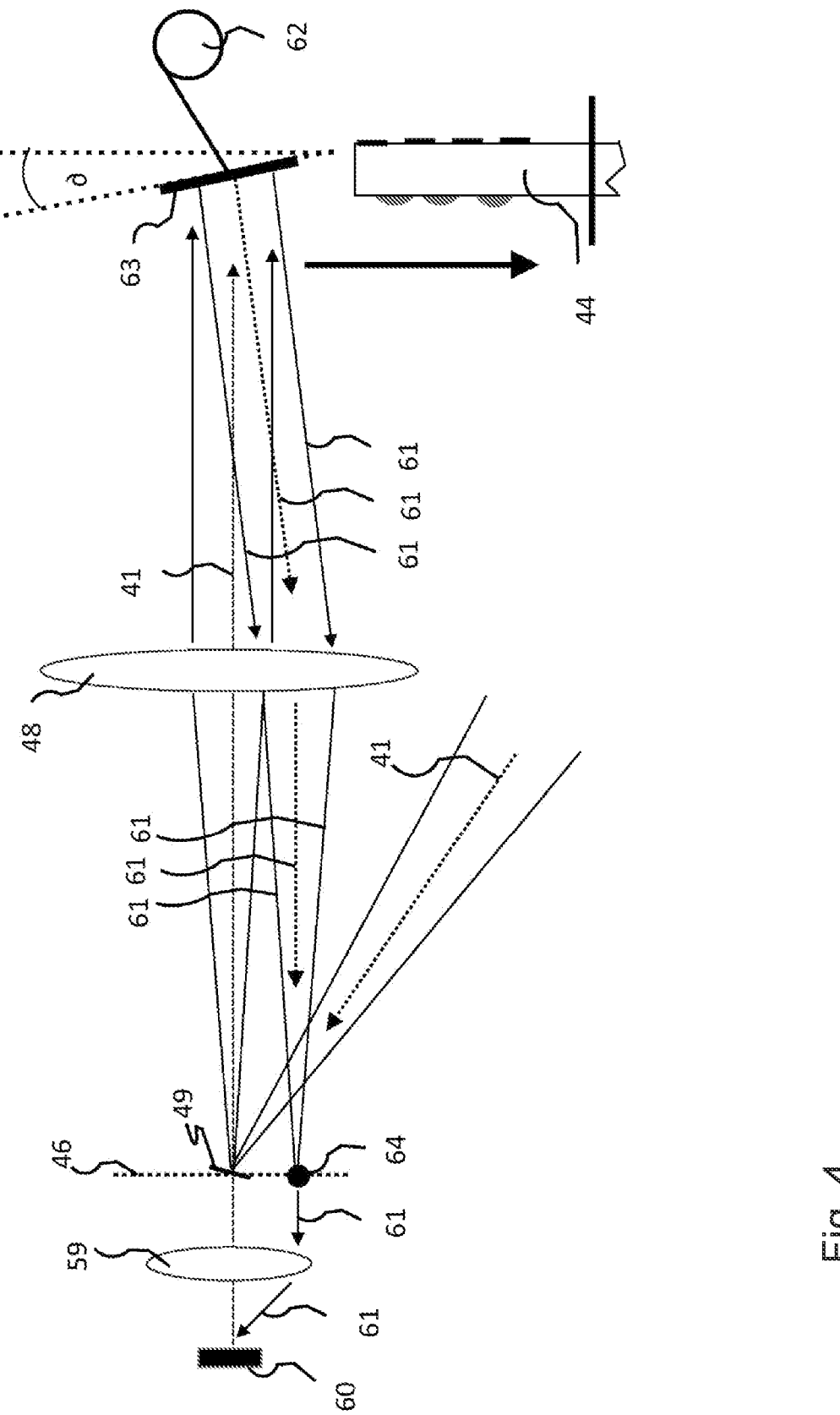
FIG. 4 show a wide-field illumination according to the invention.

FIG. 3a shows the most compact realization form for this: The excitation light 41 is coupled with a 49 glass plate 50 mirrored in the center of the focal plane 46 of the focusing element 48 and the desired reflection angle 51 is set. For a preferably selected telecentric arrangement of the entire illuminating and imaging system, the focal plane 46 of the focusing element 48 coincides with the rear focal plane 40 of the lens 59. If the focal plane of the lens 59 were accessible outside the lens 59, the central mirroring 49 could concentrate on a very small spot that only obstructs a negligible percentage of the pupil area. However, since the rear focal plane 40 of the objective 59 is usually located inside the objective 59, the inclined glass plate 50 must be positioned clearly in front of the objective pupil 40 and illuminated in such a way that the real focal point 146 of the tube lens 47 is located in front of the mirrored surface 49 and the virtual one inside the objective 59, in its pupil plane 40, as shown in FIG. 3b If the light coupled in this way is used for telecentric illumination of the disk, a field of the same size as in the intermediate illumination plane 45 is illuminated there with the same degree of collimation, whereby the light beams reflected back towards the microscope have an NA that fills the objective pupil. The central obstruction caused by the coupling mirror in front of the pupil plane is only a few percent of the total pupil area and, as long as it is exactly centered, has no image degrading effect In order to take account of situations in which the sample is not to be illuminated with rotating focus patterns, but—for example—with wide-field illumination, it is not sufficient in the present invention to remove only the disk 44 from the beam, because the collimated excitation light 41 would then run into the void. In order to be able to excite fluorescence in the sample 60, the excitation light 41 must be reflected back towards the tube lens 48 and objective 59. If the disk 44 were simply replaced by a flat dichroic mirror 63, the excitation light 41 would be reflected back onto the coupling mirror 49 and directed by it back to its starting point. However, it is possible to generate (oblique) wide-field illumination in the sample 60 by tilting a dichroic mirror by an angle (∂), whereby the reflected excitation light 61 in the focal plane 46 of the tube lens 48, which preferably coincides with the focal plane 40 of the objective 59, is deflected past the coupling mirror 49 and formed by the objective 59 into oblique wide-field illumination of the sample 60 (FIG. 4)

If the angle (∂) is chosen large enough, the method known as TIRF (Total Internal Reflection Fluorescence) can also be realized in this way. It requires the positioning of an illumination spot so far at the edge of the pupil of a specially designed TIRF objective that the beam is totally reflected at the interface close to the object and only excites layers close to the cover glass in the sample. If the dichroic mirror 63 is coupled with a tilting device 62, the "skewness" of the illumination can be adjusted up to the TIRF angle, and if 62 is a two-axis tilting device, the sample can even be excited from different directions at an angle or in TIRF mode. Particularly good images are obtained if the spot 64 of the excitation beam 61 in the objective pupil 40 is guided on a circle around its central axis during the exposure of an image.

The described modification of the beam path to generate homogeneous wide-field illumination allows the sample to be examined, as is used, for example, in the STORM or PALM method to further increase the resolution.

Another fluorescence method that benefits from the described wide-field laser illumination is the fast mapping of extended sample areas with a continuously moving sample. Here, the sample is illuminated with short flashes of light as it is moved across the objective and the pixel size set by binning is adapted to the remaining motion blur. A 40× objective, for example, has a pixel resolution of 100 nm. If a virtual resolution of 1 µm is desired, one can bin 10×10 pixels and obtain well-controlled images even with an exposure time of 50 µs. In order to also limit the motion blur to 1 µm, the sample must not be moved faster than 20 mm/s. A field of 20×20 mm is thus captured with 4× virtual magnification in little more than 40 s. This makes it possible to start an examination immediately with the high-resolution objective of choice, a considerable advantage over the state of the art, especially if the objective of choice is an immersion objective. Usually, the overview image is obtained with a low magnification objective in stop & go mode and only then can the high-resolution objective of choice be switched to.

Figure 5A:
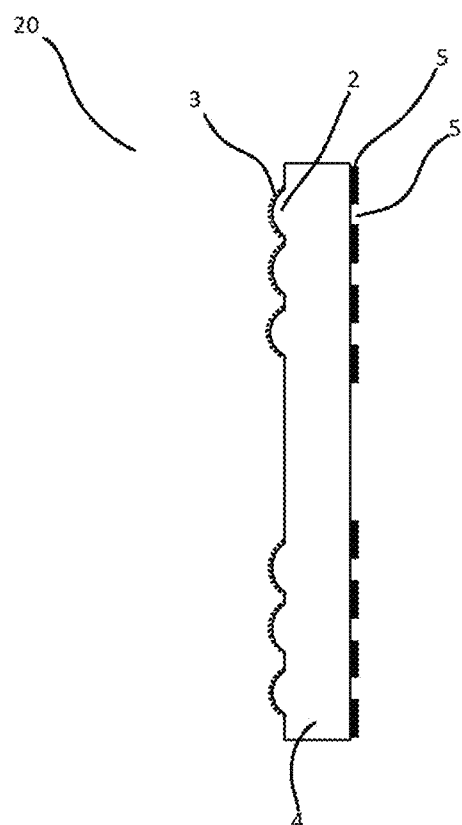
FIGS. 5a and 5b show embodiments of structured disks according to the invention.
Figure 5B:
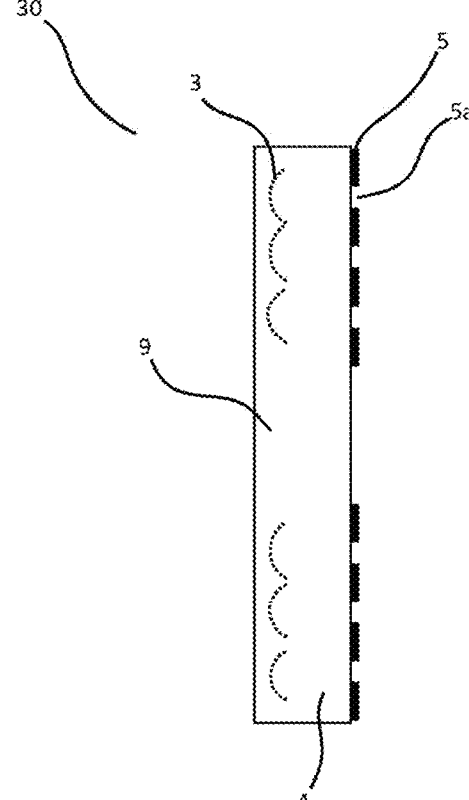

FIGS. 5a and 5b each show embodiments of the structured disk according to the invention, as used, for example, in the methods and devices according to the invention. FIG. 5a shows a structured pane 20 formed from a glass body 4. A plurality of micro-optical elements 2 is arranged on a first side of the pane 20, each of which has convexly curved, dichroically coated front surfaces 3 on its side facing away from the pane. Depending on the respective application, the coating is selected so that excitation light is reflected and emission light is transmitted. A plurality of pinholes 5a are arranged on the other side of the structured disk 20 in a so-called pinhole plane 5, with the pinholes 5a corresponding in number to the number of micro-optical elements and the pinholes and the micro-optical elements each being arranged correspondingly, as aligned around a common central axis. FIG. 5b shows a further embodiment of a structured disk 30. The structured disk 30 essentially corresponds here to the structured disk 20 shown in FIG. 5a, with the difference that the refractive power of the micro-optical elements 2 has been made to disappear by embedding the curved surface 3 in a medium 9 which has the same refractive index as the micro-optical elements 2.

FIG. 6 shows a flow chart of the method 600 according to the invention for confocal observation of a fluorescent sample with a microscope. In a first step 610 of the method, a structured disk arranged between the tube lens and the detector of a microscope is illuminated with collimated light. The structured disk is a disk as described in the context of FIGS. 5a and 5b, wherein the disk is arranged in the microscope according to the invention such that the side with the micro-optical elements faces the tube lens and the side with the pinholes faces the detector. By illuminating the plurality of micro-optical elements with collimated light, a virtual spot pattern is formed behind the plurality of curved, dichroically coated surfaces 620. Due to the dichroic coating of the curved surfaces, the rays forming the virtual spot pattern are reflected towards the tube lens 630, thus forming an excitation spot pattern in the object plane of the microscope 640, which in turn generates a fluorescent emission spot pattern 650. In the subsequent step 660, this emission light passes both the tube lens and, due to the dichroic coating, the micro-optical elements and is then confocally filtered through the pinholes 670. In a final step 680, the confocally filtered emission light can be detected by means of a suitable detector.

The scope of this disclosure includes all changes, substitutions, variations, alterations and modifications to the embodiments described or illustrated herein that would follow therefrom to those skilled in the art. The scope of this disclosure is not limited to the embodiments described or illustrated herein. Moreover, although this disclosure describes and illustrates certain embodiments herein as comprising certain components, elements, features, functions, operations, or steps, any of these embodiments may comprise any combinations or permutations of any components, elements, features, functions, operations, or steps that would be obvious to the skilled person. Any reference in the appended claims to a method, apparatus or component of an apparatus or system being adapted, arranged, capable, configured, enabled, operable or ready for operation to perform a particular function further includes that apparatus, system or component, whether or not it or that particular function is activated, turned on or enabled, so long as that apparatus, system or component is adapted, arranged, capable, configured, enabled, operable or ready for operation to do so. Moreover, although this disclosure describes or illustrates certain embodiments as advantageous, certain embodiments may provide none, some, or all of these advantages.

The invention claimed is:

1. A structured disk for confocal observation of a sample with an imaging optical system, comprising:
    a single disk-like body having a plurality of micro-optical elements on a first side and a correspondingly arranged pinhole pattern on a second side, the correspondingly arranged pinhole pattern formed by a plurality of pinholes, and each of the plurality of micro-optical elements arranged on the first side having a convex, dichroically coated front surface, wherein
    a distance between the first side and the second side of the single disk-like body is selected such that light which is inverse to divergent light resulting from reflection of collimated light at the plurality of micro-optical elements on the first side is focused into respective pinholes after transmission through the dichroic coating.

2. The structured disk according to claim 1, wherein the convex, dichroically coated front surfaces are molded in a medium having a same refractive index as the plurality of micro-optical elements and thus having an uncurved surface arranged parallel to the single disk-like body, wherein a plane of virtual illumination spots coincides with a plane of a pinhole mask.

3. The structured disk according to claim 1, wherein the convex, dichroically coated front surfaces on the first side are opposed by a second arrangement of convexly curved surfaces on an opposite side.

4. The structured disk according to claim 1, wherein the single disk-like body is formed of glass.

5. A structured disk for confocal observation of a sample with an imaging optical system, comprising:

at least one disk-like body having a plurality of micro-optical elements on a first side and a correspondingly arranged pinhole pattern on a second side, the correspondingly arranged pinhole pattern formed by a plurality of pinholes, and each of the plurality of micro-optical elements arranged on the first side having a convex, dichroically coated front surface, wherein the convex, dichroically coated front surfaces are molded in a medium having a same refractive index as the plurality of micro-optical elements and thus having an uncurved surface arranged parallel to the at least one disk-like body, a plane of virtual illumination spots coincides with a plane of a pinhole mask, the at least one disk-like body includes a first disk-shaped body and a second disk-shaped body, and the plurality of micro-optical elements on the first disk-shaped body and the plurality of pinholes on the second disk-shaped body are arranged in correlation with each other.

6. The structured disk according to claim 5, wherein the second disk-shaped body has a plurality of conjugate diverging lenses arranged thereon, each conjugate diverging lens being arranged correspondingly with a micro-optical element and a pinhole about respective central axes.

7. The structured disk according to claim 5, wherein the at least one disk-like body is formed of glass.

8. A device for confocal observation of a fluorescent sample with a microscope, the device comprising:

a disk for confocal observation of a sample with an imaging optical system, the disk including at least one disk-like body, the at least one disk-like body having a plurality of micro-optical elements on a first side and a correspondingly arranged pinhole pattern on a second side, the correspondingly arranged pinhole pattern formed by a plurality of pinholes, and each of the plurality of micro-optical elements arranged on the first side having a convex, dichroically coated front surface; wherein the disk is structured about a central axis, arranged between a tube lens and a detector of the microscope, illuminated with collimated light for excitation on a side facing the tube lens, the collimated light, due to the convex, dichroically coated front surfaces on the disk, produces a virtual spot pattern behind the convex, dichroically coated front surfaces and reflects rays back to the tube lens such that a corresponding excitation spot pattern is created therefrom in an object plane of the microscope, the corresponding excitation spot pattern generating a fluorescent spot pattern, which, after passing backwards through the tube lens, hits again the convex, dichroically coated front surfaces where excitation light was reflected, but is now transmitted due to a dichroic property of the convex, dichroically coated front surfaces, and a distance between the first side of the disk and the second side of the disk is selected such that ray bundles of the transmitted fluorescent spot pattern combine to form focal points in a plane of the plurality of pinholes and can be spatially (confocally) filtered by the correspondingly arranged pinhole pattern.

9. The device according to claim 8, further comprising:

a coupling mirror arranged centrally in a focal plane of the tube lens, wherein the coupling mirror is aligned in an image beam path such that light focused onto the coupling mirror by a focusing element hits the plurality of micro-optical elements as collimated excitation light after passing the tube lens and is reflected back to the tube lens.

10. The device according to claim 9, wherein the focal plane of the tube lens coincides with a rear focal plane of an objective.

11. The device according to claim 9, wherein the disk, which is rotatable about the central axis, is replaced by a planar dichroic mirror, the planar dichroic mirror being tilted by an angle, and the reflected excitation light in the focal plane of the tube lens, which coincides with a focal plane of an objective, is deflected past the coupling mirror and formed by the objective into an oblique wide-field illumination of the sample.

12. The device according to claim 8, wherein the at least one disk-like body is formed of glass.

13. A method for confocal observation of a fluorescent sample with a microscope, the method comprising:

illuminating with collimated light a plurality of curved, dichroically mirrored surfaces on a structured disk arranged between a first tube lens and a detector of a microscope according to claim 1, wherein a virtual spot pattern is produced behind the plurality of curved, dichroically mirrored surfaces and rays are reflected back to the first tube lens such that a corresponding excitation spot pattern is created therefrom in an object plane of the microscope, wherein the corresponding excitation spot pattern generates a fluorescent spot pattern, which, after passing backwards through the first tube lens, hits again the plurality of curved, dichroically mirrored surfaces where excitation light was reflected, but is now transmitted due to a dichroic property of the plurality of curved, dichroically mirrored surfaces, and a distance between the first side of the structured disk and the second side of the structured disk is selected such that ray bundles of the transmitted fluorescent spot pattern combine to form focal points in a plane of the plurality of pinholes and can be spatially (confocally) filtered by the correspondingly arranged pinhole pattern; and detecting a confocally filtered fluorescent spot pattern with the detector.

14. The method according to claim 13, further comprising:

coupling collimated excitation light via a coupling mirror arranged centrally in a focal plane of the first tube lens, wherein the coupling mirror is aligned in an image beam path such that light focused onto the coupling mirror by a second tube lens, after passing the first tube lens, hits the plurality of curved, dichroically mirrored surfaces as collimated excitation light and is reflected back to the first tube lens.

\* \* \* \* \*